INVENTORS.
RUSSELL H. HEILMAN,
ROBERT W. ORTMILLER
AND ARTHUR P. MUELLER.

United States Patent Office 2,971,878
Patented Feb. 14, 1961

2,971,878

INSULATION MATERIAL AND METHOD OF MAKING SAME

Russell H. Heilman, Pittsburgh, and Robert W. Ortmiller, Glenshaw, Pa., and Arthur P. Mueller, Cincinnati, Ohio, assignors to The Philip Carey Manufacturing Company, Lockland, Cincinnati, Ohio, a corporation of Ohio Filed Aug. 21, 1953, Ser. No. 375,774

20 Claims. (Cl. 162—153)

Preformed industrial insulation material is used for insulating hot pipes, boilers, conduits, and other heated vessels in which loss of heat from within is minimized by covering the parts with blocks of insulation or pre-cast sections contoured to the shapes of the element to be insulated.

Filter-molded insulation produced from a slurry of solids suspended in water has always had to be molded materially oversize to allow for drying shrinkage and for machining operations to finished dimensions. In filter-molded material as heretofore made, the shrinkage upon drying has been of the order of a volume shrinkage of from 10% to 25%. The trim loss from the machining operation is often of the order of from 10% to 35% of the volume of the dried rough piece of molded insulation.

The most widely used filter-molded insulation for use on heated surfaces at temperatures up to 600° F. has been for many years a product commercially known as 85% Magnesia. This product is composed of magnesium basic carbonate and asbestos fibres in the proportions indicated by its commercial designation.

High temperature insulation for use at temperatures up to about 2000° F. is ordinarily composed of diatomaceous earth, bonding clays, asbestos fibre, and inert filler material such as whiting. Both mixtures are prepared for filter molding in a suspension or slurry containing from 75% to 90% water and are then pumped into the cavities of a filter mold until a solid filter cake has been formed by drainage of water through the porous sides of the mold cavity. The wet molded filter cake is then removed from the mold and placed upon a suitable support after which it is dried to remove the excess water. It is in this drying stage that the large shrinkage occurs, which is variable and uneven so that the rough dried piece of insulation is of irregular contour. Then machining operations are required to reduce it to specification size. The drying shrinkage of the ordinary filter-molded product necessitates molding these products greatly oversize.

It is the object of our invention to provide, by the use of a novel combination of selected ingredients used in suitably balanced proportions, a composition which will form a sufficiently stable aqueous suspension or slurry that it may be pumped to filter molds in which the water in a single step operation may be rapidly filtered out leaving blocks or contoured pieces which, upon being removed from the molds, do not shrink materially in drying. The resulting dried insulation product is within the normally required dimension tolerances for commercial pre-molded insulation material and does not require machine milling or planing. To our knowledge, this has not been possible of accomplishment with any previous filter-molded insulation. Consequently the machining operations heretofore required are eliminated.

It is our object in this filter-molded product to produce insulation material which will withstand high temperature without disintegration, and at a lower density than has heretofore been possible in a filter-molded high temperature insulation product.

It is also our object to produce this new type thermal insulation having such balanced characteristics of composition, shrinkage, density, strength, and heat resistance that its thermal efficiency for insulation use covers adequately the entire temperature range from 200° F. to 1700° F. so that only a single material is needed for use as industrial insulation in this temperature range.

It is thus our object to provide a new type of insulation which for purposes of commercially describing our product might be called precision filter-molded thermal insulation. It is our object to produce such a product at greatly reduced cost.

The above objects and other objects to which we will refer in the ensuing disclosure we accomplish by the selection of suitable grades of expanded perlitic minerals which form a very high percentage of the bulk of the product. We have discovered that the use of this high percentage of selected grade of perlitic minerals furnishes a composition from which the water may be extracted in a filter molding operation at a very great saving in filtering time.

Suitable types of perlitic minerals are obsidian, perlite, pitchstone, vitrophyre, tachylite, pumice, and vitric or glassy tuff, and other minerals of a glassy character which contain at least 1% of bound water and generally of the range of about 2% to 6% of bound water and which can be expanded to form cellular particles upon heating under certain conditions. These minerals are not pure compounds but are of the nature of a mixture of glassy silicates which soften and eventually fuse over a considerable temperature range.

A light weight aggregate ranging in bulk density from as little as 1.5 pounds per cubic foot upwardly and containing mono- and poly-cellular particles having sealed voids is produced when the mineral is heated. There is sometimes present in the expanded mineral a varying proportion of "shatter" material, which appears to be composed of particles of cells or bubbles which have burst during formation or subsequent handling of the expanded material. The proportion of sealed void particles to shatter material varies depending upon the conditions under which the perlite is expanded.

That variety is preferred having a poly-cellular spherulitic structure inasmuch as we have found that material which produces closed cellular particles (floats) gives a lower density finished product possessing better insulating efficiency. We have found that a minimum of sixty percent of floats is desirable.

As to screen grading, we prefer an expanded perlite having a substantial proportion passing the 50 and 100 mesh sieves and only a limited amount coarser than 20 mesh. We have employed with success a grade having the following sieve specifications:

| Cumulative Percent | Retained on Tyler Standard Sieve No. |
|---|---|
| 0–15 | 30 |
| 15–50 | 50 |
| 60–80 | 100 |
| 80–95 | 200 |

In the drawings we have illustrated the type of material which it is our object to produce wherein.

Figure 1:
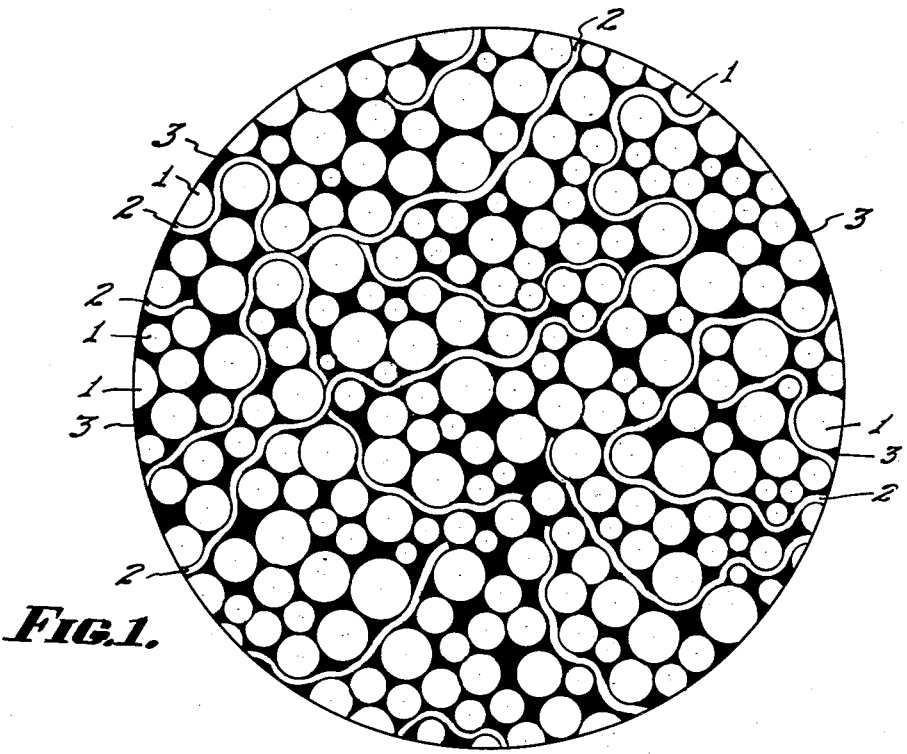
Figure 1 shows diagrammatically a very greatly enlarged cross section of our filter-molded product prior to drying, in which all the voids between the solid particles are filled with water.

In the drawings, the expanded perlitic materials are indicated at 1. As will be noted, they form a self-supporting, relatively rigid, autonomous structure bound together and reinforced to a certain extent by the fibrous particles 2 of asbestos fibre. The binder material indicated at 3 may be composed of diatomite, magnesium carbonate, 85% magnesia plastic, whiting, clay or bentonite, or suitable combinations of two or more of these materials.

Figure 2:
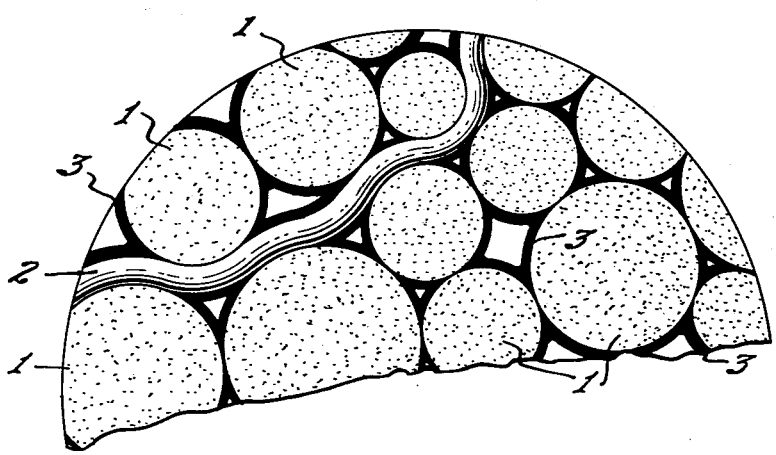
Figure 2 shows diagrammatically the same greatly enlarged cross section of Figure 1 with the binder of filler material reduced in volume after drying, which due to the structural strength and rigidity of the particle assembly, permits the binder or filler to shrink during drying forming air pockets between the particles, thereby avoiding shrinkage of the molded product per se.

Comparing Figure 1 with Figure 2, it will be noted that the particles being rigid and having surface contact support themselves against shrinkage. The binder material 3 on drying out, as shown in Figure 2, forms little voids or air pockets among the cellular particles. Because of this phenomenon, the overall dimensions of the finished product remain relatively unchanged, because the shrinkage which results from drying occurs internally.

The bulk density of the perlite which we find adaptable is from 2 to 10 pounds per cubic foot, but we prefer a density of from 3 to 8 lbs. per cubic foot. While a composition containing about 50 percent of perlite of suitable screen sizes produces insulation material having most desirable characteristics, and which has a high rate of drainage in filtering, in some cases we may use up to 60% by weight. The percentage may also be reduced materially below 50% by weight, but at a sacrifice of both drainage rate and resistance of the finished product to deterioration at temperatures above 1200° F., and loss to a certain extent of the thermal efficiency and the non-shrinking character of the wet molded product.

We require from 2% to 15% by weight of a plastic binding clay preferably of swelling type such as montmorillonite or bentonite. Preferably we employ from 5% to 12% by weight.

The asbestos fibre which we require has a fibre length predominantly of from at least ⅜ in. to ¾ in. and may be a mixture of 60% Canadian chrysotile and 40% of South African amosite. We can include in the asbestos fibre a substantial portion of fibre in excess of ¾ in. length if it has been properly prepared for admixture with the other ingredients of the composition. We prefer to use from 5% to 15% of asbestos. The asbestos fibre improves the flexural strength, compressive strength and general toughness of the product. The most satisfactory percentage is about 10%.

We may employ as a binder and plasticizer from 10 to 25% of magnesia plastic formed from pulverized waste and scrap obtained from magnesia insulation molding operations. We could use virgin magnesia and asbestos fibre but of course at a greatly increased cost over that of the scrap material of which substantial quantities are usually available.

We prefer to use about 15% of magnesia plastic. We may substitute whiting in varying percentages for all or part of the magnesia plastic. Whiting gives increased density and increased heat resistance to the precision filter-molded perlite insulation when used to replace the magnesia plastic.

We prefer to employ from 5 to 25% of diatomaceous earth such as a lightly calcined grade although natural or uncalcined diatomaceous earths give substantially as satisfactory results. Whiting in varying percentages may be substituted for all or part of the diatomaceous earth also as may be normal magnesium carbonate. A preferred percentage is about 15%.

In order to give one specific example with the physical characteristics of the product of that example, we have recited one specific formula. We have made many batches with this formula:

| | By weight, percent |
|---|---|
| Bentonite clay | 12 |
| Asbestos fibre, predominantly ⅜ to ¾ in. fibre length | 10 |
| 85% magnesia plastic | 15 |
| Lightly calcined diatomite | 15 |
| Perlite—Fine grading—4 to 8 lb. density | 48 |
| Total | 100 |

While we have specified asbestos fibre as preferable other fibres of mineral origin may also be used in the composition.

The mixture was mixed with enough water (about 85%) to form a free flowing pumpable slurry and under 35 lbs. pressure it was pumped to a 3″ x 1½″ half section pipe mold constructed of perforated metal (⅛″ perforations on 3/16″ centers), using 18 mesh 10 mil. screen on 6 oz. cotton duck as a filter medium. The mold drained completely in 5 minutes to form a good, accurate, easily removable half section of pipe covering which had after drying a bulk density of about 14 lbs. per cu. ft. and which did not shrink appreciably during drying of the molded piece.

The average test results on the products of two typical batches of the above formulation were as follows:

| | Temperature of Exposure, °F. | | |
|---|---|---|---|
| | 220° | 1,200° | 1,500° |
| Density, lb. per cubic foot | 13.91 | 13.00 | 13.21 |
| Shrinkage, percent linear | 0.07 | 0.73 | 1.26 |
| Flexural strength, lb. per sq. in. | 56.8 | 42.7 | 32.9 |
| Compressive strength at 3% deformation, lb. per sq. in. | 50.6 | 44.6 | 37.5 |

| | At Mean Temperature, °F. | | |
|---|---|---|---|
| | 100° | 500° | 1,000° |
| Thermal conductivity, B.t.u. per hr., per sq. ft., per °F., per in. | 0.434 | 0.646 | 0.910 |

We have found that the bulk density of the product of our invention as manufactured varies from about 8 to 18 lbs. per cu. ft. Normally, the more dense the finished product the higher the temperature at which the insulation will resist deterioration. Having thus described our invention, what we claim as new and desire to secure by Letters Patent is:

1. An insulation product, filter molded to given dimensions, having a bulk density within the range of 8 lbs. to 18 lbs. per cubic foot and withstanding temperatures up to about 1700° F. without disintegration, and consisting essentially of from about 20% to about 60% of expanded perlitic mineral particles having a mono- and poly-cellular spherulitic structure, from about 5% to about 15% of fibrous materials, and from about 17% to about 65% of non-combustible mineral binding constituents, said product being dimensionally usable in the "as molded" condition, without the necessity for machining the dried molded piece to finished dimensions.

2. A product as specified in claim 1, wherein the expanded perlitic mineral particles are mono- and poly-cellular perlite having a density within the range of 2 lbs. to 10 lbs. per cubic foot.

3. A product as specified in claim 1, wherein the fibrous materials are asbestos fibers having a fiber length predominantly within the general range of ⅜ inch to ¾ inch in length.

4. A product as specified in claim 1, wherein the mineral binding constituents are chosen from the class consisting of diatomite, magnesium carbonate, 85% magnesia plastic, whiting, plastic clay and bentonite.

5. A product as specified in claim 1, wherein the mineral binding constituents consist of from 2% to 15% of a plastic binding clay of the swelling type.

6. An insulation product, filter molded to given dimensions, having a bulk density within the range of 8 lbs. to 18 lbs. per cubic foot and withstanding temperatures up to about 1700° F. without disintegration, and consisting essentially of from about 48% to about 55% of expanded perlitic mineral particles having a mono- and poly-cellular spherulitic structure, about 10% of fibrous materials, and from about 35% to about 42% of non-combustible mineral binding constituents, said product being dimensionally usable in the "as molded" condition, without the necessity of machining the dried molded piece to finished dimensions.

7. An insulation product, filter molded to given dimensions, having a bulk density within the range of 8 lbs. to 18 lbs. per cubic foot and withstanding temperatures up to about 1700° F. without disintegration, and consisting essentially of about 48% of expanded perlitic mineral particles having mono- and poly-cellular spherulitic structure, about 10% of asbestos fiber, and about 42% of non-combustible mineral binding constituents, said product being dimensionally usable in the "as molded" condition, without the necessity of machining the dried molded piece to finished dimensions.

8. A product as specified in claim 7, wherein the 42% of non-combustible mineral binding constituents is made up of 12% bentonite clay, 15% of 85% magnesia plastic and 15% of lightly calcined diatomite.

9. A method of producing a precision insulation product having a density within the range of 8 lbs. to 18 lbs. per cubic foot and withstanding temperatures up to about 1700° F. without disintegration, which consists in the steps of slurrying with water from about 20% to about 60% of expanded perlitic mineral particles having a mono- and poly-cellular spherulitic structure, from about 5% to about 15% of mineral fibers, and from about 17% to about 65% of non-combustible mineral binding constituents, placing a quantitiy of said slurry into a foraminous mold and filtering out the water therefrom to produce an autonomous self-sustaining molded structure, the binding constituents thus being present in such proportions that the drying out of water does not substantially shrink the autonomous self-sustaining particle and fiber structure formed in the mold, whereby the dried product may be used in the "as molded" condition, without the necessity for machining the dried molded piece to finished dimensions.

10. A method of producing a precision insulation product as set forth in claim 9, wherein the expanded perlitic mineral particles are mono- and poly-cellular perlite having a density within the range of 2 lbs. to 10 lbs. per cubic foot.

11. A method of producing a precision insulation product as set forth in claim 9, wherein the mineral fibers are asbestos having a fiber length predominantly in the range of ⅜ inch to ¾ inch.

12. A method of producing a precision insulation product as set froth in claim 9, wherein the binding materials are chosen from the class consisting of diatomite, magnesium carbonate, 85% magnesia palstic, whiting, plastic clay and bentonite.

13. A method of producing a precision insulation product having a density within the range of 8 lbs. to 18 lbs. per cubic foot and withstanding temperatures up to about 1700° F. without disintegration, which consists in the steps of slurrying with water from about 48% to about 55% of expanded perlitic mineral particles having a mono- and poly-cellular spherulitic structure, about 10% of fibrous materials, and from about 35% to about 42% of non-combustible mineral binding constituents, placing a quantity of said slurry into a foraminous mold and filtering out the water therefrom to produce an autonomous self-sustaining molded structure, the binding constituents thus being present in such proportions that the drying out of water does not substantially shrink the autonomous self-sustaining particle and fiber structure formed in the mold, whereby the dried product may be used in the "as molded" condition without the necessity for machining the dried molded piece to finished dimensions.

14. A method of producing a precision insulation product having a density within the range of 8 lbs. to 18 lbs. per cubic foot and withstanding temperatures up to about 1700° F. without disintegration, which consists in the steps of slurrying with water about 48% of expanded perlitic mineral particles having a mono- and poly-cellular spherulitic structure, about 10% of asbestos fiber and about 42% of non-combustible mineral binding constituents, placing a quantity of said slurry into a foraminous mold and filtering out the water therefrom to produce an autonomous self-sustaining molded structure, the binding constituents thus being present in such proportions that the drying out of water does not substantially shrink the autonomous self-sustaining particle and fiber structure formed in the mold, whereby the dried product may be used in the "as molded" condition, without the necessity for machining the dried molded piece to finished dimensions.

15. A product as specified in claim 14, wherein the 42% of non-combustible mineral binding constituents is made up of 12% bentonite clay, 15% of 85% magnesia plastic and 15% of lightly calcined diatomite.

16. A molded light weight insulating material consisting essentially of particles of expanded perlite some of which are as fine as 100 mesh in size, the perlite particles being in substantial contact, said contacts being characterized by point contacts as distinguished from surface contacts, thereby leaving a multitude of connecting interstices between the particles, and a minor amount of short fiber lying in said interstices and constituting a fiber network to hold said perlite in the molded shape, and a non-combustible mineral binding constituent.

17. A molded lightweight thermal insulating material consisting essentially of particles of expanded perlite some of which are as fine as 100 mesh in size and with only a limited amount of particles coarser than 20 mesh, the perlite particles being in substantial contact, said contacts being characterized by point contacts as distinguished from surface contacts, thereby leaving a multitude of connecting interstices between the particles, a minor amount of short fiber lying in said interstices and constituting a fiber network to hold said perlite in the molded shape, and a non-combustible mineral binding constituent, said molded insulating material having high resistance to disintegration at high temperatures.

18. A molded lightweight thermal insulating material consisting essentially of expanded perlite particles some of which are as fine as 100 mesh in size and with only a limited amount coarser than 20 mesh, the perlite particles being in substantial contact, said contacts being characterized by point contacts as distinguished from surface contacts, thereby leaving a multitude of connecting interstices between the particles, a minor amount of short fiber lying in said interstices and constituting a fiber network to hold said perlite in the molded shape, and a non-combustible mineral binding constituent, said molded insulating material having a bulk density within the range of 8 lbs. to 18 lbs. per cubic foot and having high resistance to disintegration at high temperatures.

19. A method of producing a precision filter molded thermal insulation having high resistance to disintegration at high temperatures which consists in slurrying with water a mixture of expanded perlite particles, some of which are as fine as 100 mesh, a minor amount of short fiber and a non-combustible mineral binding constituent, filtering out the excess water in a press to form an autonomous self-sustaining molded structure wherein the perlite particles are in substantial contact, said contacts being characterized by point contacts as distinguished from surface contacts, thereby leaving a multitude of connecting interstices between the particles, said short fiber lying in said interstices and constituting a fiber network to hold said perlite in the molded shape, said molded structure of perlite particles, fiber and binder being substantially non-shrinking from its original molded dimensions when dried to remove the retained water.

20. A method of producing a precision molded light weight thermal insulating material having high resistance to disintegration at temperatures up to about 1700° F., which consists in the steps of slurrying with water a mixutre consisting of about 20% to about 60% of particles of expanded perlite some of which are as fine as 100 mesh in size, about 17% to about 65% of non-combustible mineral binding constituents, and a minor amount of short fiber, placing a quantity of said slurry into a foraminous mold and filtering out the water therefrom to produce an autonomous self-sustaining molded structure wherein the expanded perlite particles are in substantial contact, said contacts being characterized by point contacts as distinguished from surface contacts, thereby leaving a multitude of connecting interstices between the particles, said short fiber lying in said interstices and constituting a fiber network to hold said perlite in the molded shape, whereby the drying out of water does not substantially shrink the autonomous self-sustaining perlite particle and fiber structure formed in the mold, and the dried product may be used in the "as molded" condition, without the necessity for machining the dried molded piece to finished dimensions.

References Cited in the file of this patent

UNITED STATES PATENTS

| | | |
|---|---|---|
| 1,887,726 | Weber | Nov. 15, 1932 |
| 2,319,033 | Bernstein et al. | May 11, 1943 |
| 2,388,060 | Hicks | Oct. 30, 1945 |
| 2,487,207 | Adams | Nov. 8, 1949 |
| 2,501,698 | Stecker | Mar. 28, 1950 |
| 2,547,997 | Bowers | Apr. 10, 1951 |
| 2,554,934 | Ayers | May 29, 1951 |
| 2,586,726 | Schuetz et al. | Feb. 19, 1952 |
| 2,626,864 | Miscall et al. | Jan. 27, 1953 |
| 2,634,207 | Miscall et al. | Apr. 7, 1953 |
| 2,634,208 | Miscall et al. | Apr. 7, 1953 |
| 2,705,198 | Seybold | Mar. 29, 1955 |